(12) United States Patent
Crowsley

(10) Patent No.: US 9,822,775 B2
(45) Date of Patent: Nov. 21, 2017

(54) PERISTALTIC PUMP AND PUMPHEAD THEREFOR

(75) Inventor: David Crowsley, Cornwall (GB)

(73) Assignee: Watson-Marlow Limited, Falmouth, Cornwall (GB)

( * ) Notice: Subject to any disclaimer, the term of this patent is extended or adjusted under 35 U.S.C. 154(b) by 736 days.

(21) Appl. No.: 14/353,942

(22) PCT Filed: May 29, 2012

(86) PCT No.: PCT/GB2012/051207
§ 371 (c)(1),
(2), (4) Date: Apr. 24, 2014

(87) PCT Pub. No.: WO2013/061021
PCT Pub. Date: May 2, 2013

(65) Prior Publication Data
US 2014/0294634 A1    Oct. 2, 2014

(30) Foreign Application Priority Data

Oct. 25, 2011    (GB) .................................... 1118426.4

(51) Int. Cl.
*F04B 43/12* (2006.01)
*F04B 53/22* (2006.01)
(Continued)

(52) U.S. Cl.
CPC ...... *F04B 43/1238* (2013.01); *F04B 43/0072* (2013.01); *F04B 43/1253* (2013.01);
(Continued)

(58) Field of Classification Search
CPC .............. F04B 43/0072; F04B 43/1238; F04B 43/1253; F04B 43/1261; F04B 43/1284;
(Continued)

(56) References Cited

U.S. PATENT DOCUMENTS 2,360,761 A  *  10/1944  Clickner ................. F16L 33/24
                                                        285/251
3,120,125 A       2/1964  Vasel
(Continued)

FOREIGN PATENT DOCUMENTS

CN     102102656 A    6/2011
DE       925326 C    3/1955
(Continued)

OTHER PUBLICATIONS

Patent Cooperation Treaty, PCT Notification Concerning Transmittal of International Preliminary Report of Patentability (Chaper 1 of the Patent Cooperation Treaty), PCT/IB/326, PCT/GB2012/051208, dated May 8, 2014.
(Continued)

*Primary Examiner* — Dominick L Plakkoottam
(74) *Attorney, Agent, or Firm* — Robert A. Blaha; Smith Tempel Blaha LLC

(57) ABSTRACT

A peristaltic pumphead comprising a pumphead housing accommodating a pumping tube, an end of the tube being provided with an end fitting having a through passage and an abutment shoulder and a threaded shank extending from the abutment shoulder into the tube the tube end abutting the abutment shoulder and being accommodated in an opening, in the pumphead housing, the abutment shoulder abutting the housing at the opening, and the end fitting being engaged by a retaining element to retain the abutment shoulder against the housing.

20 Claims, 12 Drawing Sheets

(51) Int. Cl.
*F04B 43/00* (2006.01)
*F16L 33/24* (2006.01)

(52) U.S. Cl.
CPC ...... *F04B 43/1261* (2013.01); *F04B 43/1284* (2013.01); *F04B 53/22* (2013.01); *F16L 33/24* (2013.01); *Y10T 29/4924* (2015.01)

(58) Field of Classification Search
CPC ...... F04B 53/22; F04B 43/08; F04B 43/1292; F16L 33/24; F16L 33/223; A61M 5/14232
See application file for complete search history.

(56) References Cited

U.S. PATENT DOCUMENTS

| | | | |
|---|---|---|---|
| 3,902,745 A | | 9/1975 | Mooney et al. |
| 4,231,668 A | * | 11/1980 | Groth ............... B05C 11/11 401/146 |
| 4,484,864 A | | 11/1984 | Michel |
| 4,540,350 A | | 9/1985 | Streicher |
| 4,661,045 A | | 4/1987 | Winston et al. |
| 5,173,019 A | | 12/1992 | Sdano |
| 5,240,291 A | * | 8/1993 | Zornow ............. F16L 33/24 285/148.19 |
| 5,350,284 A | | 9/1994 | Wehling |
| 5,499,902 A | | 3/1996 | Rockwood |
| 5,531,680 A | | 7/1996 | Dumas et al. |
| 6,041,709 A | * | 3/2000 | Wells ................ B41F 31/08 101/350.6 |
| 6,274,880 B1 | | 8/2001 | Walker |
| 6,293,758 B1 | | 9/2001 | Green et al. |
| 6,412,484 B1 | * | 7/2002 | Izuchukwu ......... A61M 16/208 128/202.19 |
| 6,685,450 B2 | | 2/2004 | Bandis |
| 7,001,153 B2 | | 2/2006 | McDowell et al. |
| 7,380,837 B2 | * | 6/2008 | Fullbeck ............ F16L 33/2073 285/256 |
| 8,585,099 B2 | * | 11/2013 | Nielson .............. F16L 19/08 285/247 |
| 2002/0151838 A1 | | 10/2002 | Beck et al. |
| 2003/0031590 A1 | | 2/2003 | Park |
| 2004/0028544 A1 | | 2/2004 | Schmitt |
| 2004/0265154 A1 | | 12/2004 | McDowell et al. |
| 2006/0132351 A1 | | 6/2006 | Le Sesne |
| 2008/0025854 A1 | | 1/2008 | Schippers |
| 2009/0214365 A1 | * | 8/2009 | Norman ............ A61M 5/14232 417/474 |
| 2010/0200756 A1 | | 8/2010 | Maiden |
| 2010/0209263 A1 | | 8/2010 | Mazur |
| 2011/0150679 A1 | | 6/2011 | Ramirez, Jr. et al. |

FOREIGN PATENT DOCUMENTS

| | | | | |
|---|---|---|---|---|
| DE | 2714738 A1 | | 10/1978 | |
| EP | 0114455 A1 | | 8/1984 | |
| EP | 059874 A1 | | 11/1993 | |
| EP | 0972937 A2 | | 1/2000 | |
| EP | 2290354 A1 | | 3/2011 | |
| FR | 2094506 A5 | | 2/1972 | |
| GB | 570914 A | | 7/1945 | |
| GB | 628785 A | | 9/1949 | |
| GB | 680270 A | * | 10/1952 | ............ F16L 33/223 |
| GB | 774528 A | | 5/1957 | |
| JP | 53148706 A | | 12/1978 | |
| JP | US5859988 | | 4/1983 | |
| JP | H02196178 A | | 8/1990 | |
| JP | 3026887 A | | 2/1991 | |
| JP | H0744554 | | 11/1995 | |
| JP | 08049667 A | | 2/1996 | |
| JP | 2000345971 A | | 12/2000 | |
| JP | 2008-88915 A | | 4/2008 | |
| JP | 2009-074534 A | | 10/2010 | |
| WO | WO/94/03728 | | 2/1994 | |
| WO | WO/9641081 A | | 12/1996 | |

OTHER PUBLICATIONS

Patent Cooperation Treaty, PCT Notification Concerning Transmittal of International Preliminary Report of Patentability (Chapter I of the Patent Cooperation Treaty), PCT/IB/326, PCT/GB2012/051208, dated May 8, 2014.

English Translation of Japanese Report of Office Action, Patent Application No. 2014-53771, dated Sep. 29, 2015.

* cited by examiner

PERISTALTIC PUMP AND PUMPHEAD THEREFOR

CROSS REFERENCE TO RELATED APPLICATIONS

This is a U.S. national phase application of International Application PCT/GB2012/051207 filed on May 29, 2012, to which priority is claimed and which is hereby incorporated by reference herein in its entirety.

This invention relates to a peristaltic pump and a pumphead therefor.

Peristaltic pumps are commonly used for applications in which it is undesirable for a pumped fluid to contact pump components. For example, peristaltic pumps are often used to pump sterilised or abrasive fluids where contact of the fluid with internal pump components would risk contaminating the fluid or damaging the pump. Peristaltic pumps are therefore often used in the beverage industry in which sterile pumping processes are required and in the aggregates industry in which slurries containing abrasive particles need to be transferred.

Peristaltic pumps generally comprise a pump housing through which a tube extends and a pressing element arranged within the pump housing for exerting a peristaltic action on the tube. The pressing element typically has one or more rollers or "wipers" which are moved along the tube to exert the peristaltic action.

The pump housing and pressing element are often manufactured as a self contained unit. Assembly of a pump therefore requires a tube to be threaded through the housing between the rollers/wipers and the inner wall of the housing. The compression of the tube between the rollers/wipers and the pump housing makes assembly difficult since the assembler often has to apply a large amount of force to draw the tube through the housing. Furthermore, it is important to ensure that the tube is properly arranged within the housing. The difficulty in assembly hampers precise arrangement of the tube within the housing.

According to a first aspect of the present invention there is provided a peristaltic pumphead comprising a pumphead housing accommodating a pumping tube, an end of the tube being provided with an end fitting having a through passage and an abutment shoulder and a threaded shank extending from the abutment shoulder into the tube, the tube end abutting the abutment shoulder and being accommodated in an opening in the pumphead housing, the abutment shoulder abutting the housing at the opening, and the end fitting being engaged by a retaining element to retain the abutment shoulder against the housing.

The threaded shank may be tapered in the direction away from the abutment shoulder.

The retaining element may comprise a threaded portion which engages with a threaded portion of the pumphead housing.

The end fitting may comprise separable first and second parts, the first part comprising the abutment shoulder and threaded shank and the second part comprising a spigot for attachment to a tube, the retaining element being arranged to secure the first and second parts together.

The first part may comprise a tool engagement feature with which a tool can be engaged to rotate the first part with respect to the tube.

A recess may be provided at the periphery of the opening such that a circumferential slot is defined between the shoulder and the pumphead housing, the tube end being engaged with the circumferential slot.

According to a second aspect of the present invention there is provided a method of assembling a peristaltic pumphead in accordance with a first aspect of the invention, comprising:

inserting the tube end into the pumphead housing;

inserting the threaded shank of the end fitting into the tube end such that the threaded shank engages with the tube;

bringing the abutment shoulder into abutting engagement with the pumphead housing; and rotating the threaded shank with respect to the tube such that the tube is drawn along the threaded shank towards the abutment shoulder.

The rotation of the threaded shank with respect to the tube to draw the tube along the threaded shank further draws the tube along the threaded shank into pressing engagement with the abutment shoulder.

The retaining element may be engaged with the fitting to retain the fitting against the housing.

For a better understanding of the present invention, and to show more clearly how it may be carried into effect, reference will now be made, by way of example, to the accompanying drawings, in which.

Figure 1:
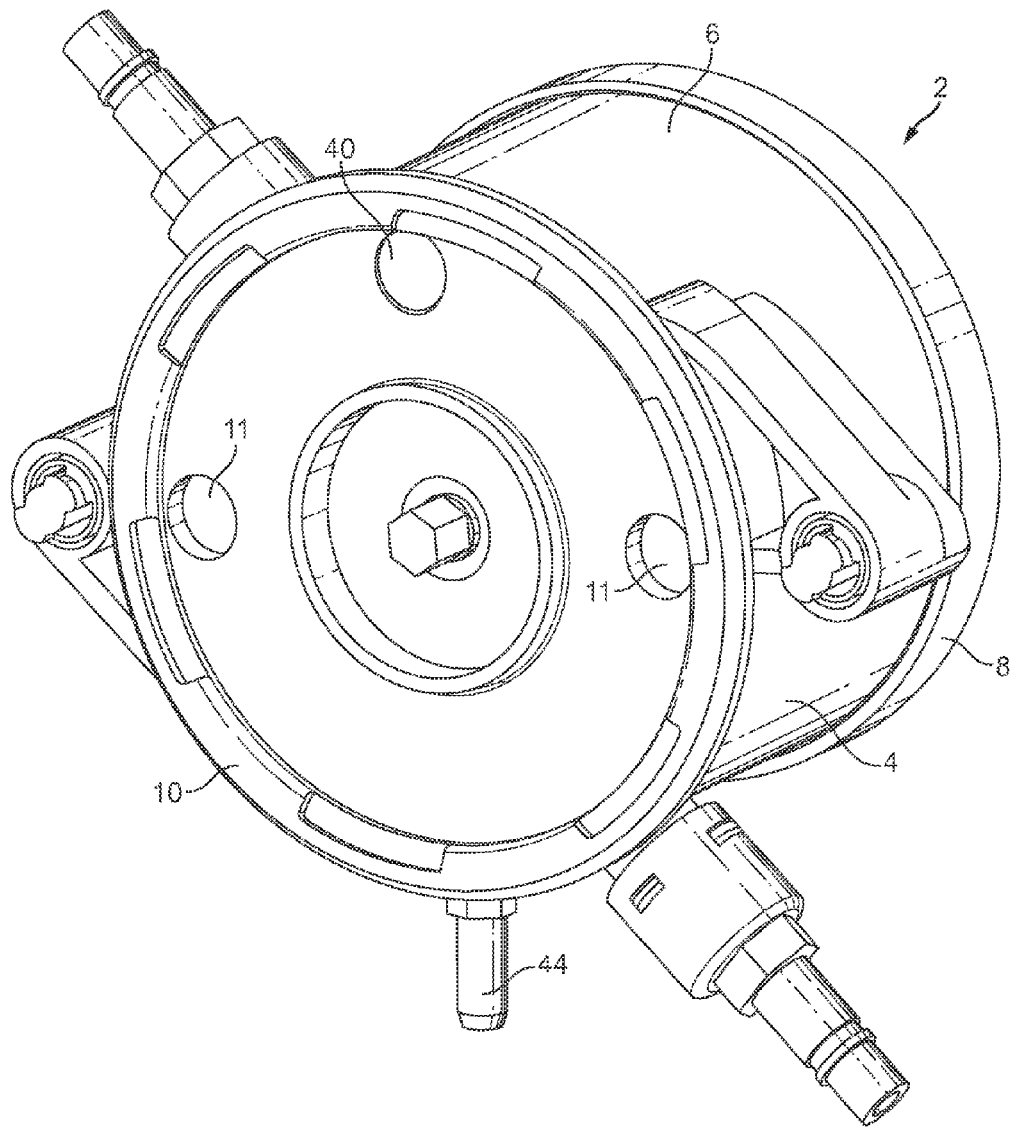
FIG. 1 is a perspective view of a pumphead for a peristaltic pump.
Figure 3:
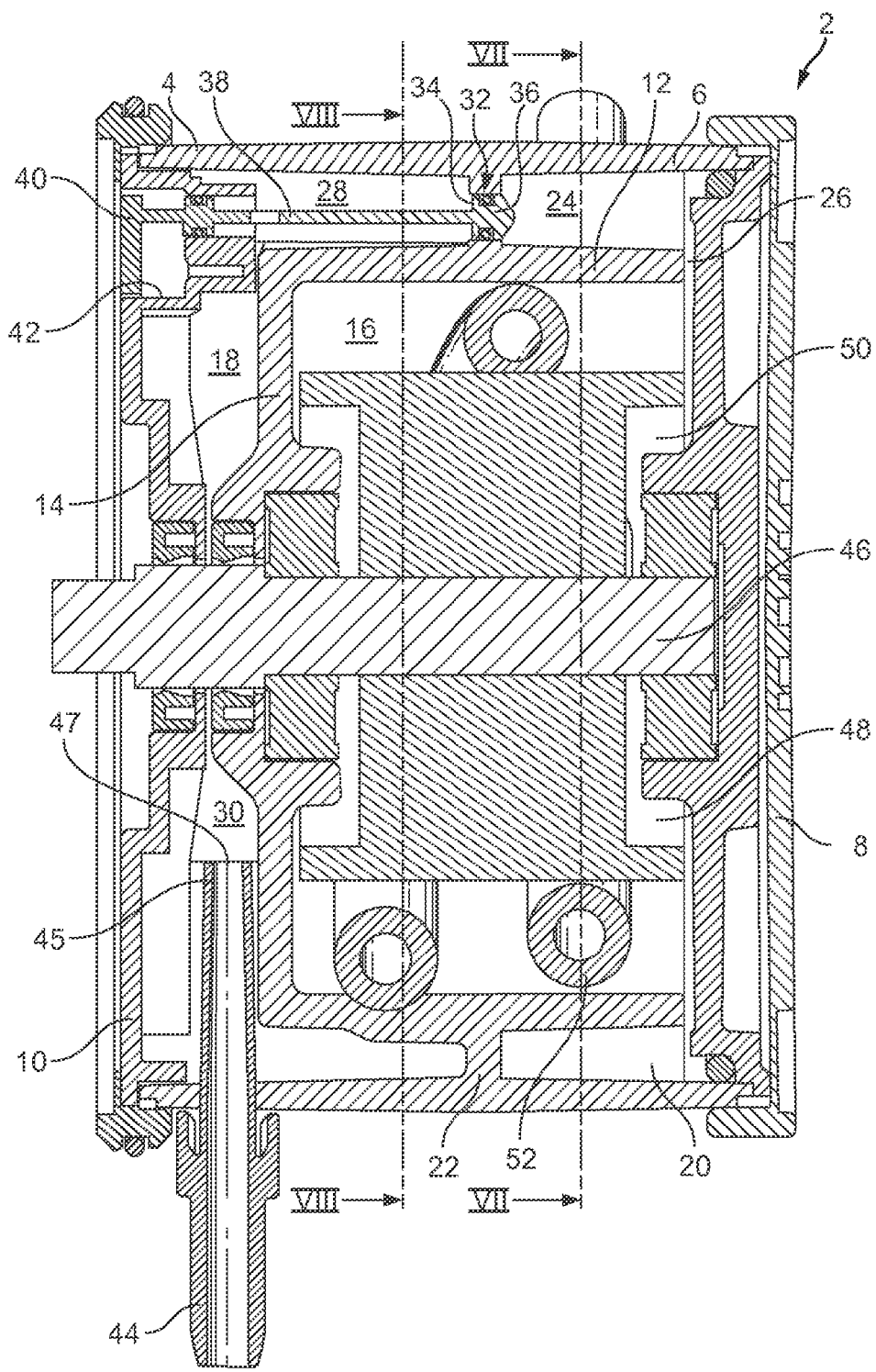
FIG. 3 is a sectional view of the pumphead shown in FIG. 1.
Figure 6:
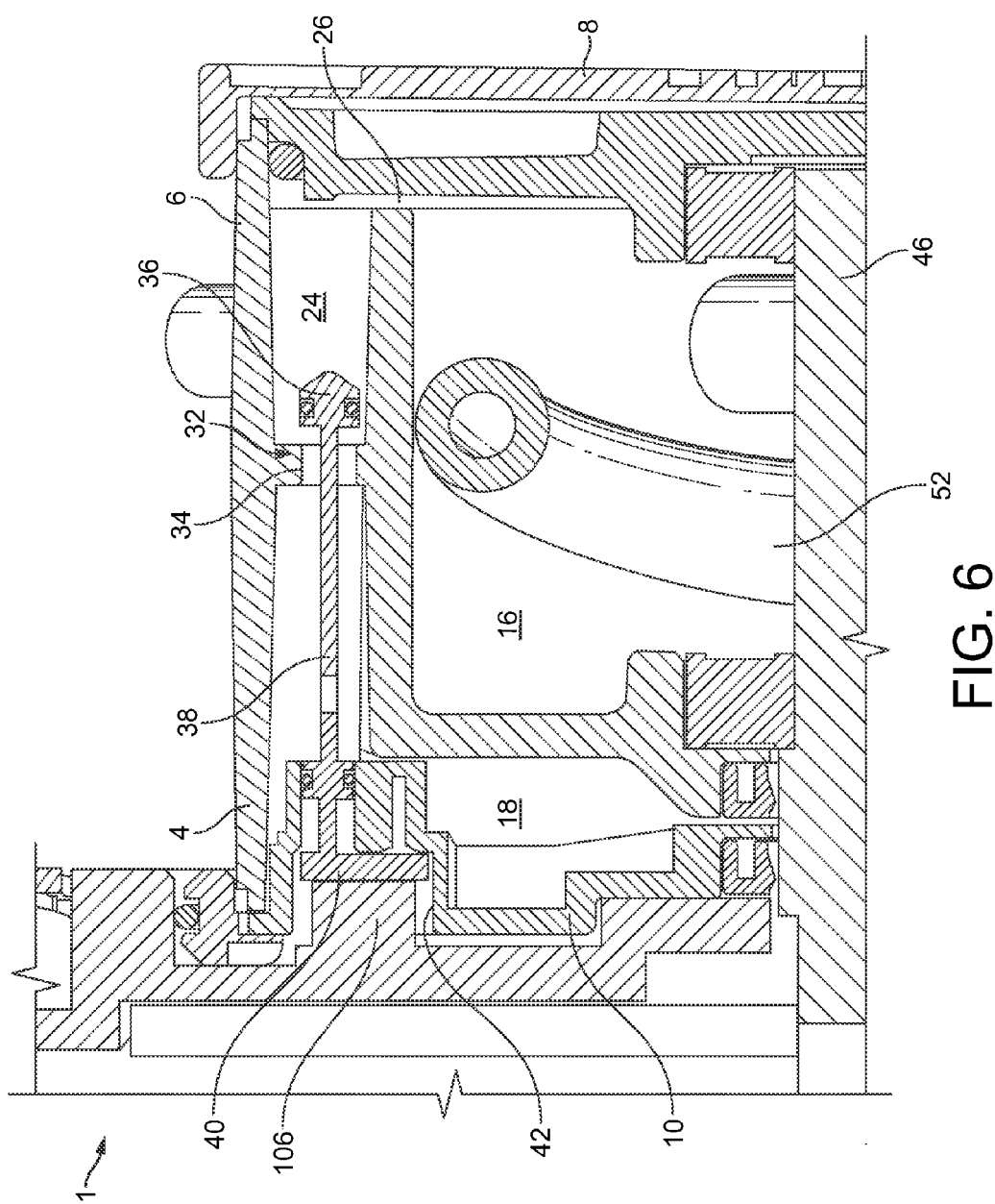
Figure 7:
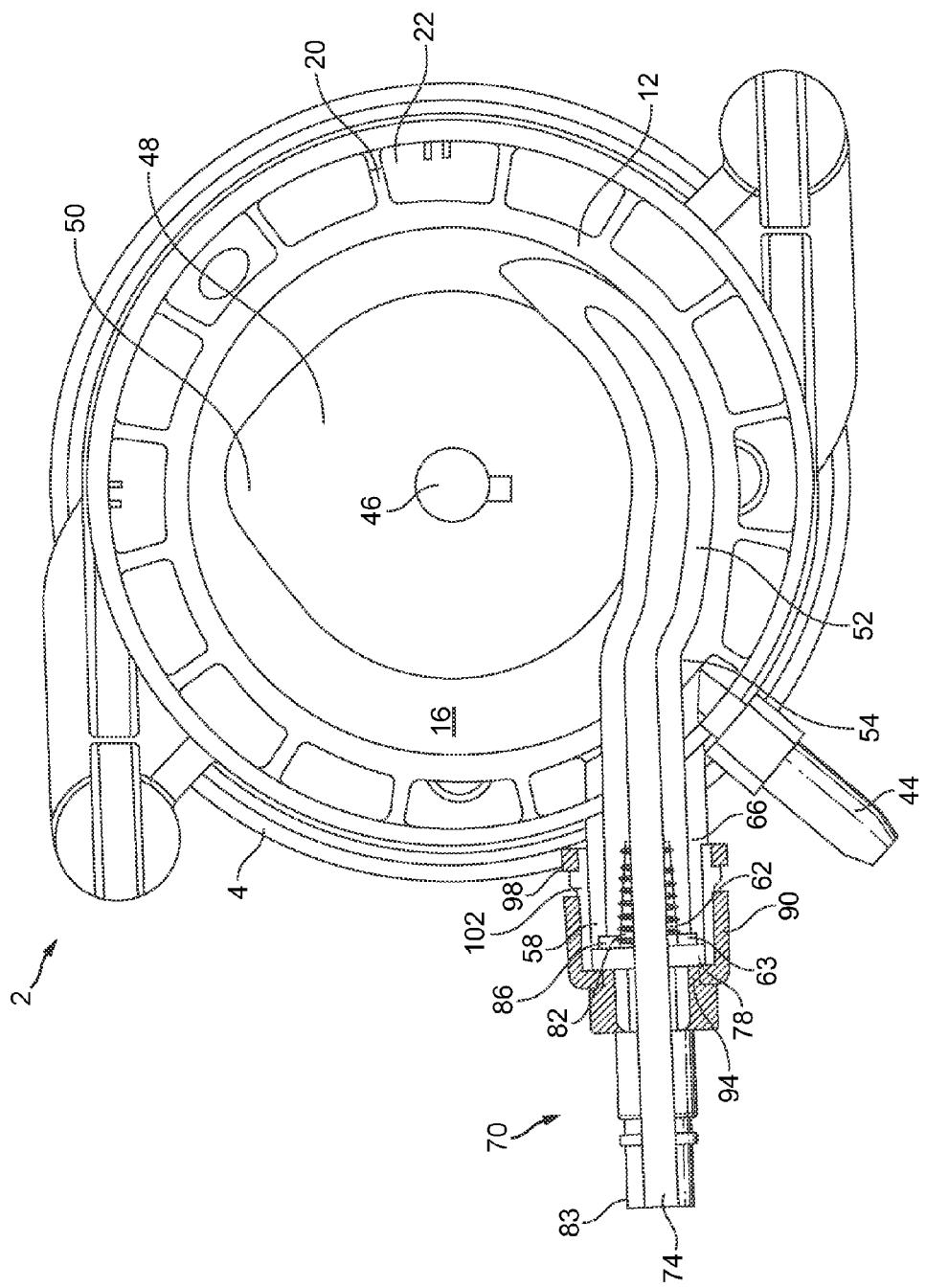
Figure 8:
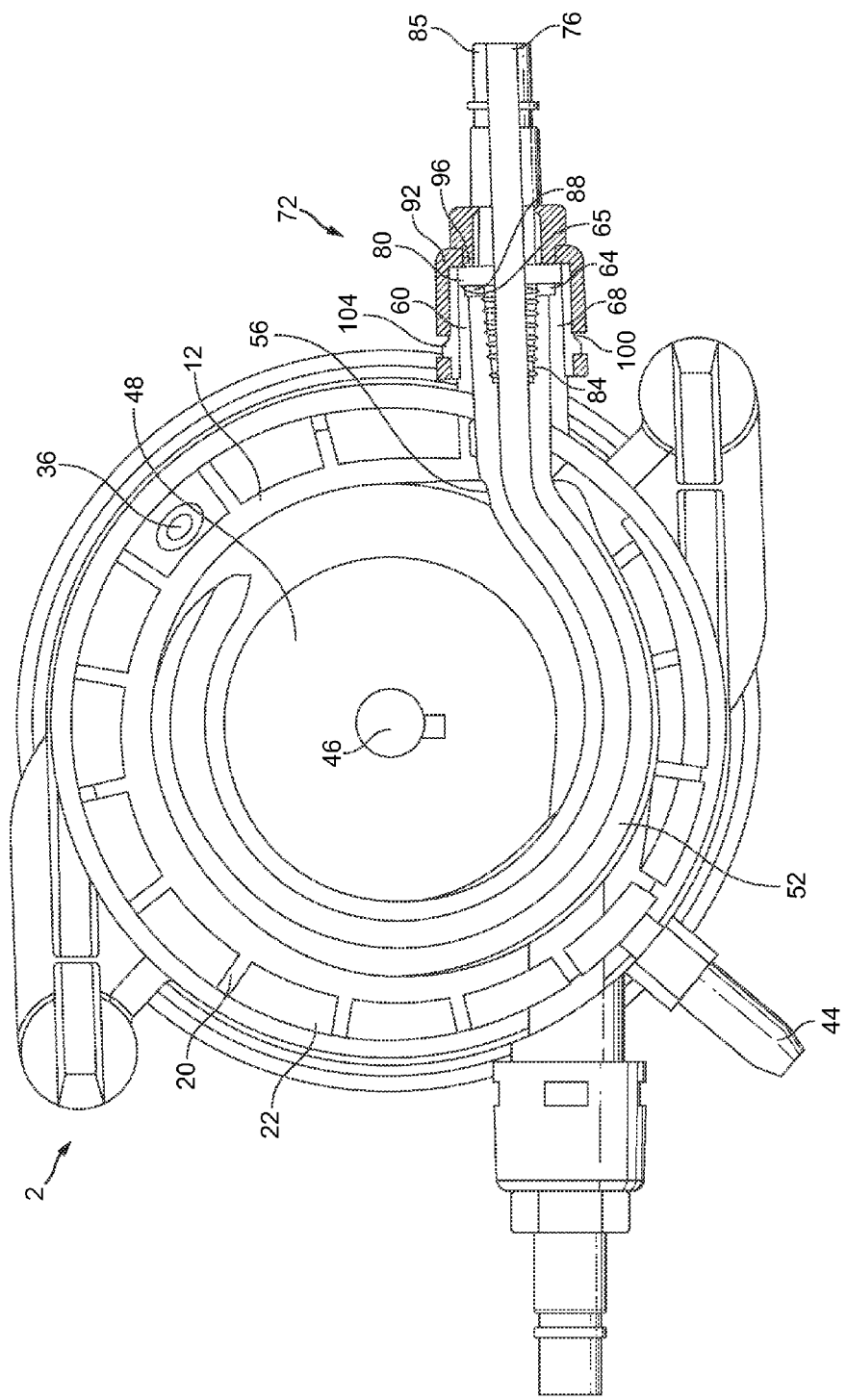
Figure 9:
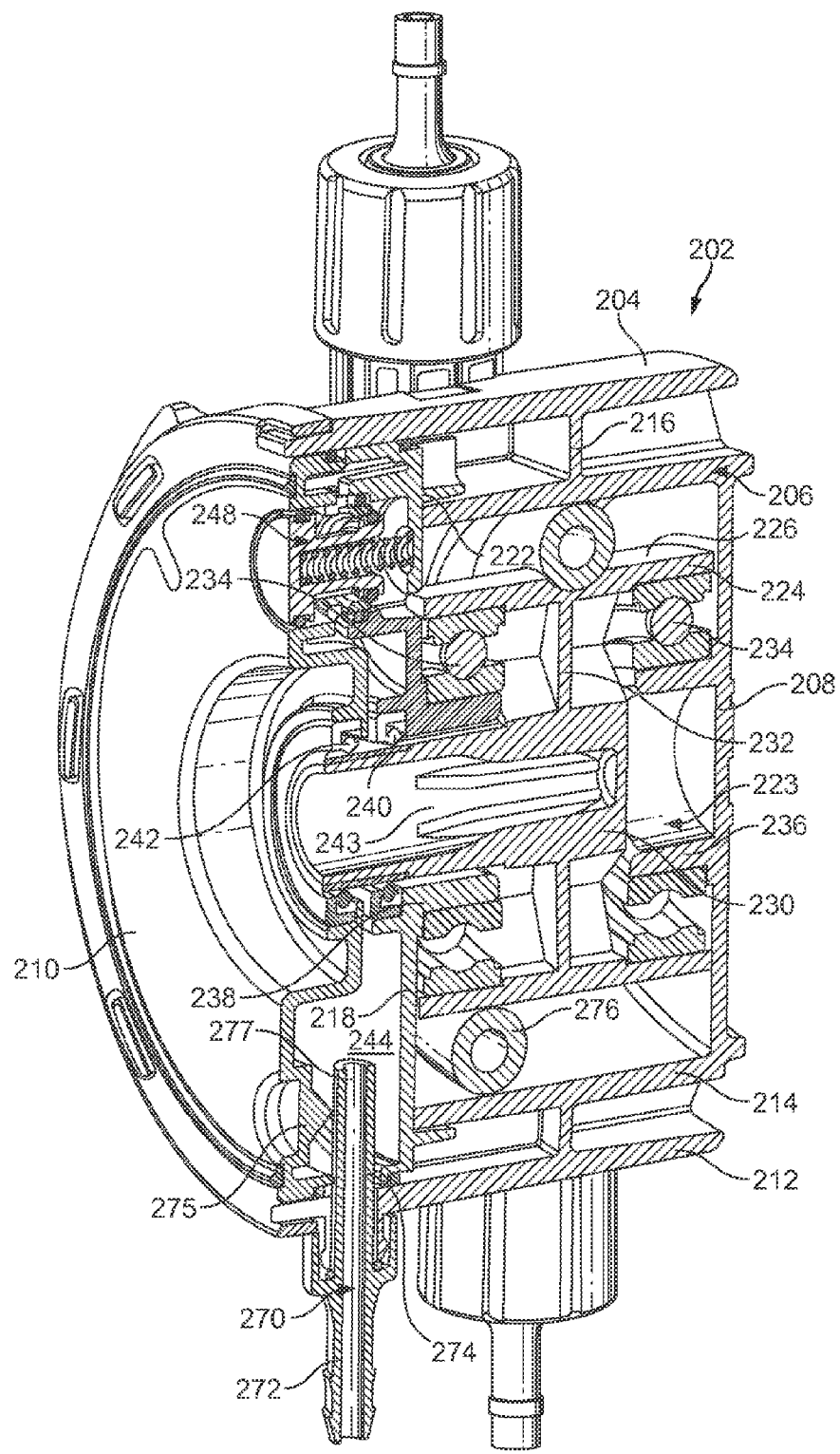
Figure 10:
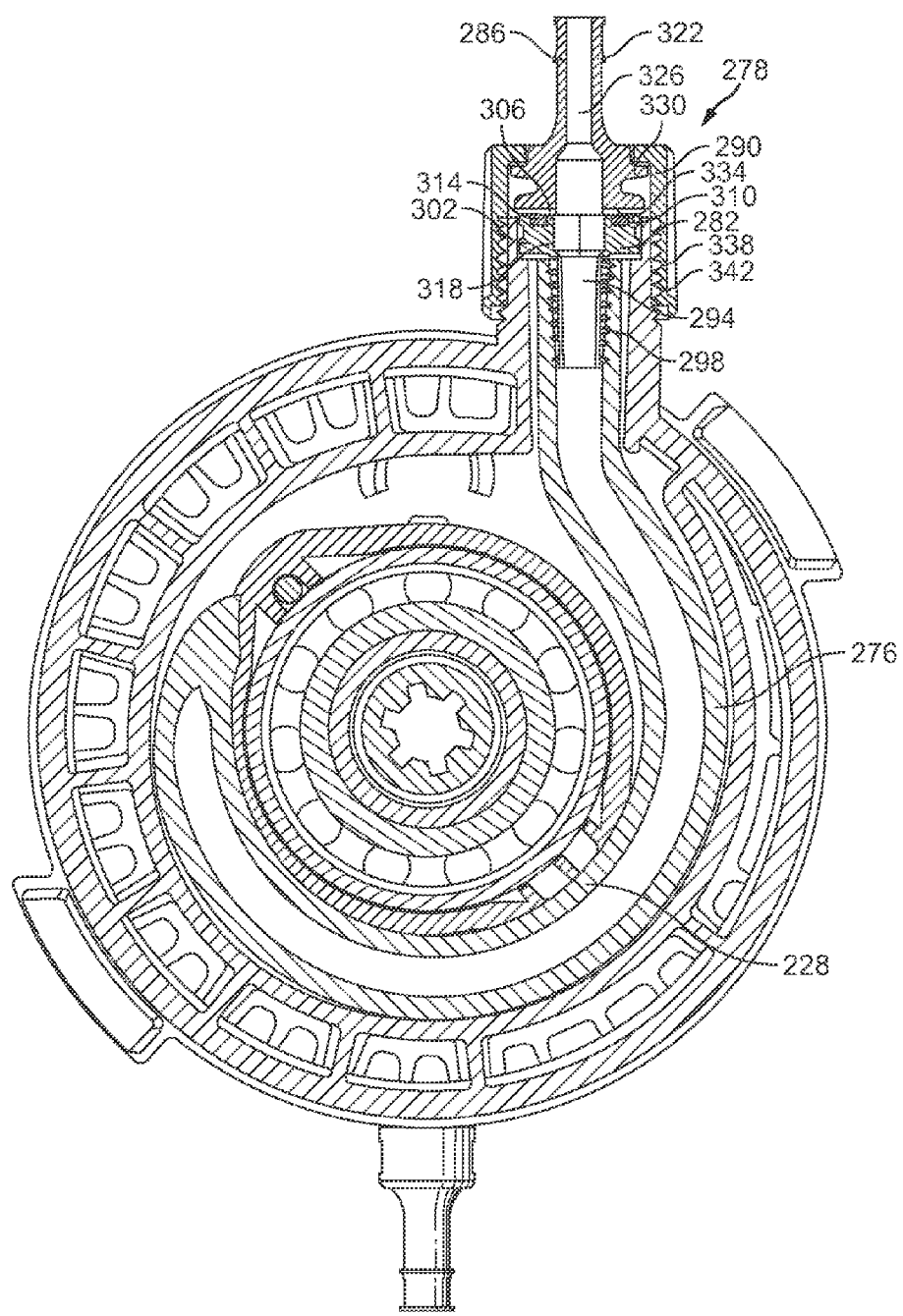
Figure 11:
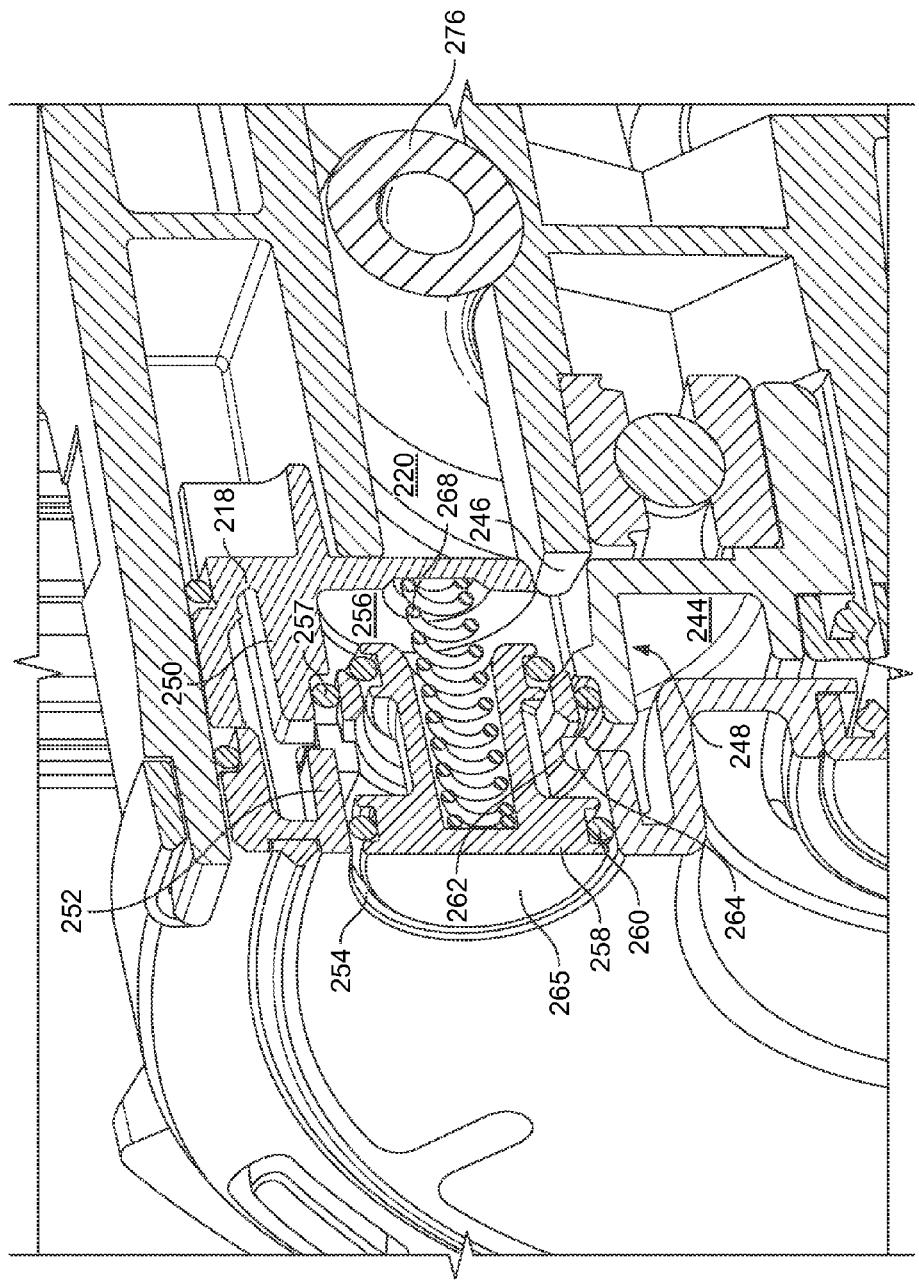
Figure 12:
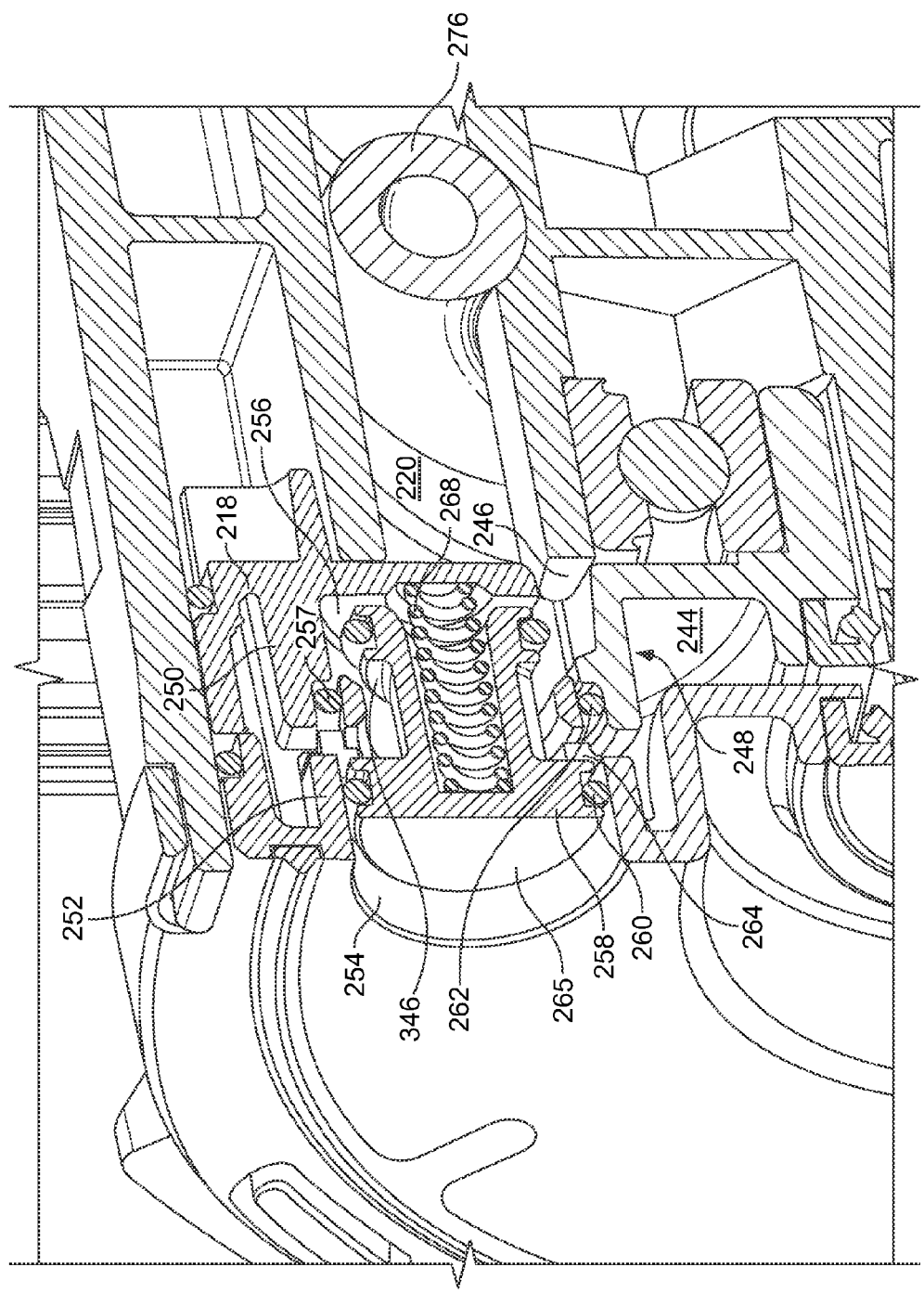

FIG. 6 corresponds to 5, but shows the valve open;

FIG. 7 is a sectional view of the pumphead along line VII shown in FIG. 3;

FIG. 8 is a further sectional view of the pumphead along line VIII shown in FIG. 3; and FIG. 9 is a cut-away perspective view of a variant of the pumphead shown in FIG. 1;

FIG. 10 is a sectional view of the pumphead shown in FIG. 9;

FIG. 11 is an enlarged view of the pumphead as shown in FIG. 9 in the region of a valve showing the valve closed; and FIG. 12 corresponds to the view shown in FIG. 11, but shows the valve open.

Figure 2:
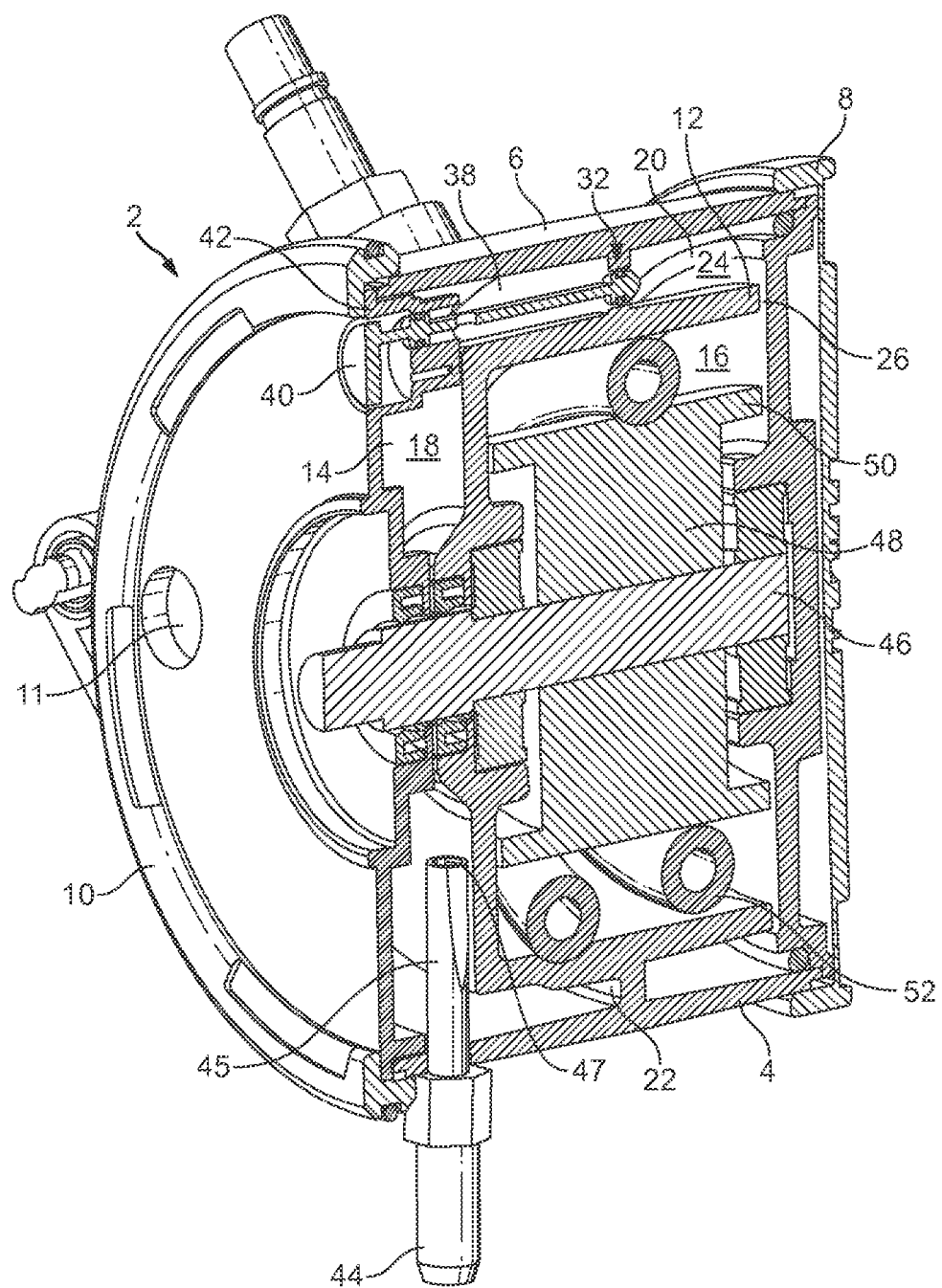
FIG. 2 is a cut-away perspective view of the pumphead shown in FIG. 1.

FIGS. 1 and 2 show a pumphead 2 for use in a peristaltic pump. The pumphead 2 comprises a housing 4 having a substantially cylindrical outer wall 6 enclosed at opposite ends by end caps 8, 10 any or all of which may be made from a suitable thermoplastics material. The outer wall 6 and/or one or both of the end caps may be made by molding. The end caps 8, 10 may be spin welded or ultrasonically staked onto the outer wall 6 to form a sealed housing 4. The cylindrical outer wall 6 of the housing 4 defines a pumphead axis. The end cap 10 comprises locating recesses 11 into which projections on a drive unit 1 (shown in part in FIG. 6) locate to ensure that the pumphead 2 is arranged with respect to the drive unit 1 in one of several predetermined orientations.

As shown in FIG. 2, the housing 4 is divided by a substantially cylindrical inner wall 12 and an internal end wall 14 into a pumping chamber 16 and an auxiliary chamber 18. The inner walls 12, 14 are supported on the outer wall 6 by axially and radially extending spars 20 and a circumferential rib 22 which extends perpendicularly to the inner and outer cylindrical walls 6, 12. The inner wall 12 and the outer wall 6 define an annular passageway 24 which extends between an annular slot 26, which is defined between the inner wall 12 and the end cap 8, and the circumferential rib 22. The annular slot 26 provides fluid communication between the pumping chamber 16 and the passageway 24.

The auxiliary chamber 18 is coaxial with the pumping chamber 16. As shown in FIG. 3, the auxiliary chamber 18 comprises an annular region 28 which extends about the pumping chamber 16 and a collecting region 30 which is substantially cylindrical and is generally defined between the end cap 10 and the inner end wall 14.

A valve 32 is disposed between the pumping chamber 16 and the auxiliary chamber 18. The valve 32 comprises a port 34 in the circumferential rib 22 and a piston 36 which is movable into and out of sealing engagement with the port 34 to close and open the valve 32. The piston 36 is connected to a plunger 38 which extends from the piston 36 through the end cap 10 defining the auxiliary chamber 18 so that it protrudes from the housing 4. The end of the plunger 38 which protrudes through the housing 4 has a pressing feature 40, such as a button, which can be pressed to actuate the plunger 38 thereby moving the piston 36 out of sealing engagement with the port 34 and opening the valve 32. The pressing feature 40 is located in a recess 42 provided in the end cap 10. The pressing feature 40 and the recess 42 are configured such that the pressing feature 40 is flush with the main portion of the end cap 10 when the valve 32 is closed.

The auxiliary chamber 18 is provided with an outlet. The outlet comprises a pipe 44 which extends through the outer wall 6 and projects into a lower region of the auxiliary chamber 18. The portion of the pipe 44 within the auxiliary chamber 18 provides a snorkel 45 which extends into the auxiliary chamber 18 and has a snorkel inlet 47 which is situated within the auxiliary chamber 18 above the lowest point of the auxiliary chamber 18 when in the intended operating orientation of the pumphead 2, as shown in FIG. 3. The region of the auxiliary chamber 18 which surrounds the snorkel 45 defines a reservoir in the vicinity of the snorkel 45 in which liquid is received when the snorkel 45 is in an upright position. The portion of the pipe 44 which extends outside the pumphead 2 away from the outer wall 6 provides a spigot to which a hose (not shown) can be connected.

A rotor 46 extends along the pumphead axis through the end cap 10, the end wall 14 and pumping chamber 16. The rotor 46 is supported by bearings within the pumphead 2. The portion of the rotor 46 which projects from the pumphead 2 can be connected to a drive unit 1 for driving the rotor 46. The regions of the end cap 10 and the end wall 14 through which the rotor 46 extends are profiled such that they abut each other at the pumphead axis. As a result, the rotor 46 is not exposed to the auxiliary chamber 18. A pressing element 48 is arranged within the pumping chamber 16. The pressing element 48 is coupled for rotation with the rotor 46. The pressing element 48 has lobes 50 (shown more clearly in FIG. 7) which are arranged to press a tube 52, disposed about the pressing element 48, against the inner wall 12. The inner wall 12 therefore both separates the pumping chamber 16 from the auxiliary chamber 18 and provides a pressing surface against which the tube 52 is pressed.

Figure 4:
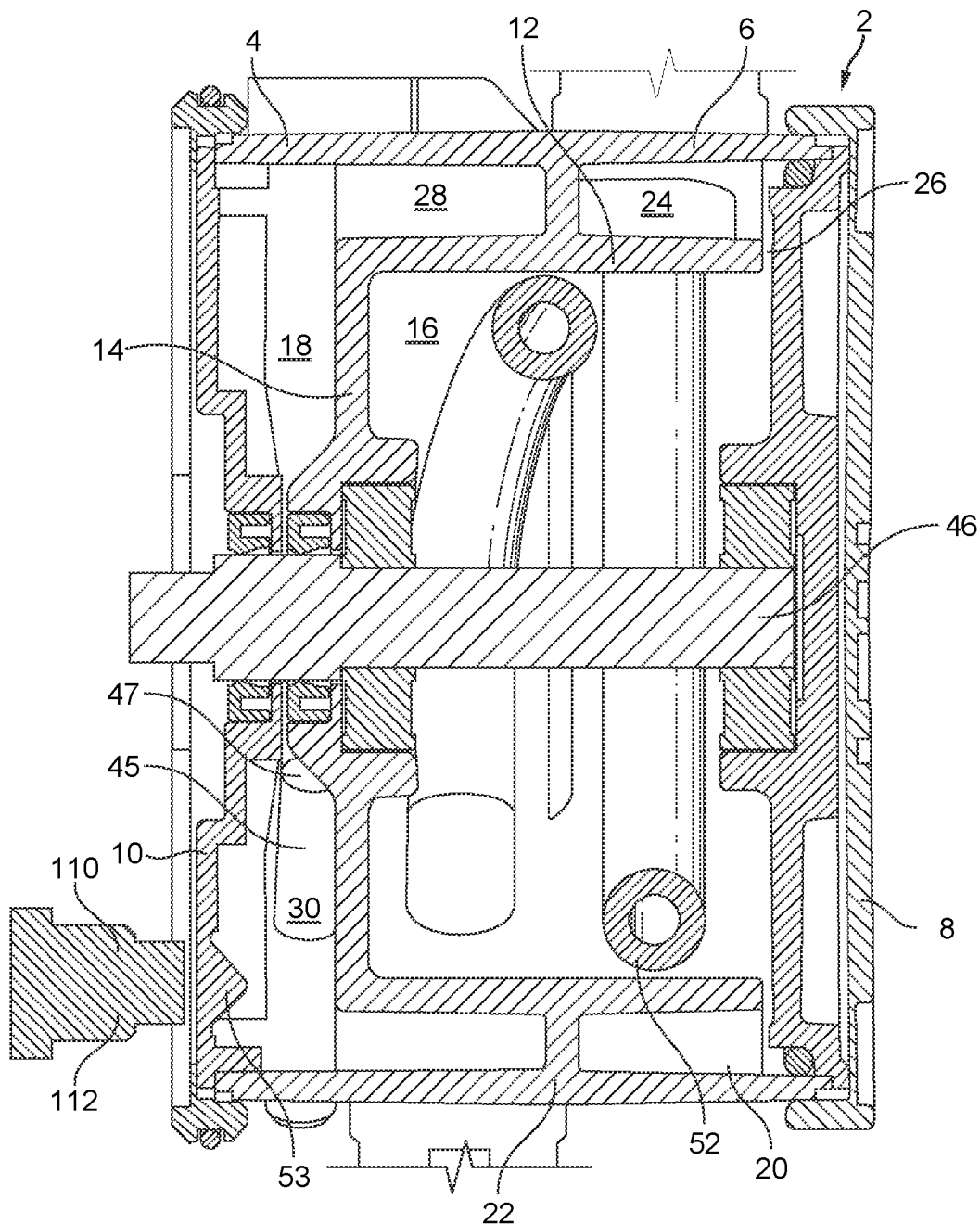
FIG. 4 is a further sectional view of the pumphead shown in FIG. 1 arranged with respect to an emitter and a receiver.

As shown in FIG. 4, the pumphead 2 further comprises a reflector 53 which is disposed in the auxiliary chamber 18 in the region of the reservoir. The reflector 53 comprises a cone which is made from a material that is substantially transparent to infra-red light, although it will be appreciated that other wavelengths of electromagnetic radiation may be used. The reflector 53 may, for example, be made of polysulphone or other suitable material. The reflector 53 is arranged such that the cone converges from the end cap 10 into the auxiliary chamber 18, the base of the cone being exposed to the outside of the pumphead 2. The reflector 53 may be formed integrally with the end cap 10.

When the reservoir in the auxiliary chamber 18 is dry, the conical surface of the cone 53 is exposed to air. Under this condition, infra-red light passing through the base and travelling parallel to the cone axis is internally reflected at the conical surface of the cone to be returned through the base. In the embodiment shown, the reflector 53, and in particular its vertex angle, is configured such that, when the cone is exposed to a liquid, the interface between the cone and the liquid ceases to be reflective to infra-red light, and so the intensity of light returned through the base will decrease in accordance with the extent to which the cone is submerged.

As shown in FIGS. 7 and 8, the pumping chamber 16 has first and second ports 54, 56 which are provided in the inner wall 12. Respective first and second passageways 58, 60 extend from the ports 54, 56 to respective first and second apertures 62, 64 provided in bosses 66, 68 formed in the outer wall 6. The passageways 58, 60 provide direct communication between the pumping chamber 16 and the apertures 62, 64 in the outer wall 6. The passageways 58, 60 extend tangentially with respect to the housing 6 in generally opposite directions.

Recess 63, 65 are provided in the bosses 66, 68. Each recess 63, 65 extends about the periphery of a respective aperture 62, 64.

The tube 52 extends from the first aperture 62, along the first passageway 58, through the pumping chamber 16, and from the pumping chamber 16 along the second passageway 60 to the second aperture 64. The tube 52 is arranged in a single loop about the rotor 46 so that it is disposed between the pressing element 48 and the inner wall 12.

A tube end fitting 70, 72 is disposed at each of the apertures 62, 64. Each end fitting 70, 72 has a through passage 74, 76 that extends longitudinally with respect to the end fitting 70, 72, an abutment shoulder 78, 80 in the form of a flange, and an externally threaded shank 82, 84 which extends away from the abutment shoulder 78, 80. The threaded shank 82, 84 is tapered in the direction away from the abutment shoulder 78, 80. A spigot 83, 85 is provided at the end of the fitting 70, 72 opposite the threaded shank 82, 84. The spigot 83, 85 can be connected to a hose (not shown).

Each end fitting 70, 72 is arranged such that the abutment shoulder 78, 80 abuts one of the bosses 66, 68 formed in the outer wall 6, and the threaded shank 82, 84 extends along the passageway 58, 60 towards the pumping chamber 16. The threaded shank 82, 84 extends into an end of the tube 52 such that the thread engages with the inner wall of the tube 52. The outer diameter of the threaded shank 82, 84 adjacent the abutment shoulder 78, 80 may be sized such that the shank 82, 84 cooperates with the inner wall of the passageway 58, 60 to clamp the tube 52 between the connector 70, 72 and the housing 4. The abutment shoulder 78, 80 and corresponding recess 63, 65 about the periphery of the aperture 62, 64 define a circumferentially extending slot 86, 88 which receives the end of the tube 52.

A retaining element comprising a resilient cap 90, 92 is disposed over the end of each fitting 70, 72. Each cap 90, 92 has an opening 94, 96 in the end of the cap 90, 92 through which the spigot 83, 85 extends. Further openings 98, 100 are circumferentially spaced about the sidewall of the cap 90, 92. These openings 98, 100 engage with corresponding projections 102, 104 provided on the portion of the housing 4 adjacent the apertures 62, 64.

Assembly of the tube 52 within the pumphead 2 is as follows.

An end of the tube 52 is inserted through the first aperture 62 and first passageway 58 into the housing 4 and pushed into the pumping chamber 16. The end of the tube 52 contacts the inner wall 12 and slides along the inner surface of the inner wall 12 about the rotor 46, between the lobes 50 of the pressing element 48 and the inner wall 12, and exits the pumping chamber 16 through the second passageway 60 and second aperture 64. The tube 52 may comprise a lead portion (not shown) having an external diameter which is smaller than the clearance between the lobes 50 and the inner wall 12. A smaller diameter portion allows the lead portion tube 50 to be threaded through the housing easily. Once the lead portion of the tube 52 has been threaded through the housing 4, the main portion of the tube 52 can be drawn through by pulling on the lead portion. Once the main portion of the tube 52 is in situ, the lead portion can be severed from the tube 52. The tube 52 could be threaded through the housing 4 in the opposite direction by inserting the end of the tube 52 through the second aperture 64.

It will be appreciated that the length of tube 52 within the housing 4 must be sized to ensure proper operation of the pumphead. The tube 52 has a length which, when the ends of the tube 52 are disposed at the apertures 62, 64, the tube 52 is expected to be properly arranged within the pumping chamber 16. It is anticipated that, once the tube 52 has been pulled through the pumphead, one or both of the ends of the tube 52 will not be properly located at the apertures 62, 64. For example, the end of the tube first inserted into the pumphead 2 may have been pulled partially through the second passageway 60 (e.g. because person assembling the pumphead is unable to exert enough force to pull the tube through the housing 4).

The threaded shank 84 of the fitting 72 to be disposed at the second aperture 64 is inserted through the second aperture 64 and into the end of the tube 52. The thread engages with the inner wall of the tube 52. The abutment shoulder 80 is brought into engagement with the boss 68 of the housing 4 by pushing the fitting 72 towards the housing 4 or by rotating the fitting 72 with respect to the tube 52 so that the threaded engagement between the tube 52 and the fitting 72 draws the threaded shank 84 further into the tube 52. Once the abutment shoulder 80 abuts the boss 68, the boss 68 prevents the fitting 72 from being drawn further into the housing 4. The fitting 72 is then rotated or further rotated with respect to the tube 52 to draw the end of the tube 52 along the threaded shank 84 towards the abutment shoulder 80 and the aperture 64. As the tube 52 is drawn towards the abutment shoulder 80 it is squeezed between the threaded shank 84 and the inner wall of the passageway 60. Once the end of the tube 52 abuts the abutment shoulder 80, further rotation of the fitting 72 with respect to the housing 4, forces the end of the tube 52 into the circumferential slot 88 defined between the abutment shoulder 80 and the recess 65 in the housing 4. The end of the tube 52 is therefore firmly located at the second aperture 64 in the correct position.

The cap 92 is placed over the fitting 72 so that the spigot 85 passes through the opening 96 in the end of the cap 92. The cap 92 is forced over the projections 104 to splay the cap 92 and to force the cap 92 against the flange forming the abutment shoulder 80. Once the openings 100 align with the projections 104, the projections 104 enter the openings and the cap 92 returns to its original shape to secure the cap 92 to the housing 4 and to clamp the flange, and hence the fitting 72 to the housing 4. The cap 92 is therefore snap-fitted to the housing 4.

The fitting 70 and corresponding cap 90 at the first aperture 62 is fitted in the same manner as the fitting 2 at the second aperture 64.

Mounting of the pumphead 2 on a drive unit 1 is as follows.

Figure 5:
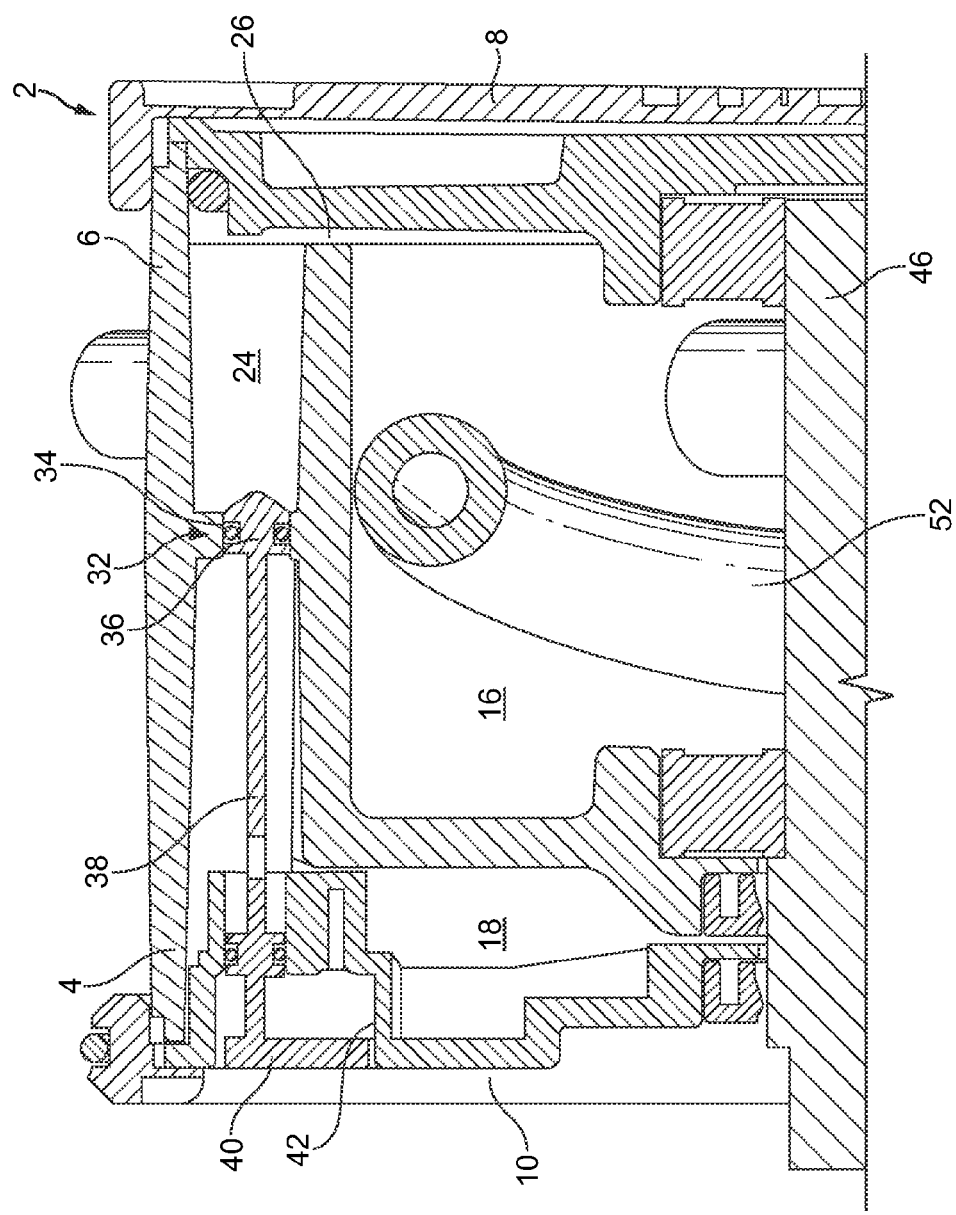
FIG. 5 is an enlarged partial sectional view of the pumphead which corresponds to the sectional view shown in FIG. 3 in which a valve within the pumphead is closed.

Prior to use, for example, after the tube 52 has been assembled within the pumphead 2, a lubricant, typically a liquid, is added to the pumping chamber 16. The amount of lubricant is sufficient to substantially coat the tube 52 and the pressing element 48, but does not fill the pumping chamber 16. The valve 32 is closed with the piston 36 in sealing engagement with the port 34, as shown in FIG. 5. The auxiliary chamber 18 is therefore sealed from the pumping chamber 16 thereby preventing the lubricant from escaping from the pumping chamber 16 into the auxiliary chamber 18. The pumphead 2 can therefore be transported and handled without risk of leakage of the lubricant from the pumping chamber 16 into the auxiliary chamber 18 and thence from the pumphead. Consequently, the auxiliary chamber 18 will remain dry prior to use.

The pumphead 2 is mounted to the drive unit 1 in a substantially upright condition with the valve 32 towards the top of the pumphead 2. Lubricant within the pumping chamber 16 will therefore tend to accumulate at the bottom of the chamber 16 away from the valve 32.

The drive unit 1 to which the pumphead is mounted comprises a means, which in the embodiment shown is a projection 106 (shown in FIG. 6) from the drive unit 1, which aligns with the pressing feature 40 of the pumphead 2. Upon mounting of the pumphead 2, the pressing feature 40 is brought into pressing engagement with the projection 106 so that the projection 106 presses the pressing feature 40 into the recess 42 in the end cap 10. As shown in FIG. 6, the pressing feature 40 acts on the plunger 38 to displace the piston 36 out of sealing engagement with the port 34 thereby opening the valve 32. Because the valve 32 is opened only at the time of mounting the pumphead 2 on the drive unit 1, at which point the pumphead is fixed in an upright condition, there is less risk of lubricant being transferred through the valve 32 into the auxiliary chamber 18.

The drive unit 1 also comprises an emitter 110 and a receiver 112 for emitting and receiving infrared light, respectively. The emitter 110 may be a light emitting diode and the receiver 112 may be a phototransistor. The emitter 110 and the receiver 112 are arranged on the drive unit 1 such that when the pumphead 2 is attached to the drive unit 1, the reflector 53 is arranged to reflect infra-red light emitted by the emitter 110 towards the receiver 112. The arrangement of the emitter 110 and the receiver 112 with respect to the reflector 53 is shown in FIG. 4. In the embodiment shown, the emitter 110 and receiver 112 are contained within the same housing. The emitter 110, receiver 112 and reflector 53 together comprise an optical sensor capable of detecting liquid within the auxiliary chamber 18. In the present embodiment, the reflector 53 is configured to exhibit substantially total internal reflection for infra-red light emitted by the emitter 110 when there is no liquid present on the outer surface of the cone. Therefore, when the pumphead 2 is first mounted onto the drive unit 1, the receiver 112 detects the presence of the reflected infra-red light. A controller connected to the receiver 112 is used to determine that the reflector 53 is not exposed to liquid and therefore that there is substantially no liquid in the auxiliary chamber 18.

The reflector 53 is a simple moulding and so is relatively inexpensive compared with the emitter 110 and receiver 112. An advantage of the above arrangement is that the pumphead 2 can be disposed of as a unit when worn out or damaged, and in particular when the tube 52 reaches the end of its life, and a replacement pumphead fitted comprising its own reflector. The arrangement does not require replacement of the emitter 110 and receiver 112 which are mounted on the drive unit 1. Consequently, the cost of replacing pumpheads is significantly reduced by comparison with pumpheads having expensive sensing elements mounted in the pumphead. Furthermore, a pumphead 2 which is sealed by spin welding the end caps 8, 10 onto the cylindrical housing 6 improves the integrity of the pumphead 2 for disposal.

During use, the rotor 46 is rotated to press the tube 52 between the lobes 50 of the pressing element 48 and the inner wall 12 thereby exerting a peristaltic action on the tube 52. The peristaltic action pumps a liquid through the tube 52. The portion of the inner wall 12 which defines the annular passage 24 acts as a barrier between the pumping chamber 16 and the valve 32. The inner wall 12 therefore inhibits lubricant splashed by the pumping action from entering the auxiliary chamber 18 through the valve 32.

If, during use, the tube 52 ruptures or otherwise begins to leak within the pumping chamber 16, liquid which is being pumped through the tube 52 escapes from the tube 52 into the pumping chamber 16 and the passageway 24. As the amount of escaped liquid increases, the level of liquid within the pumping chamber 16 rises above the top of the inner wall 16 and flows from the passageway 24 through the valve 32 into the auxiliary chamber 18.

Liquid which enters the auxiliary chamber 18 accumulates in the reservoir around the snorkel 45. As liquid accumulates in the reservoir, the level of the liquid reaches the reflector 53 thereby exposing at least part of the outer surface of the cone of the reflector 53 to the liquid. The liquid has a higher refractive index than air and so reduces the amount of internal reflection exhibited by the reflector 53. Consequently, the amount of infra-red light reflected back towards the receiver 112 reduces. The reduction in reflected radiation is detected by the controller and used to determine that liquid is present in the reservoir. An output, for example an alert, is then generated which indicates that the tube has failed (i.e. ruptured) and a leak has occurred. The pump can then be stopped automatically or by a user in response to the output.

It the level continues to rise above the snorkel inlet, the liquid is discharged from the auxiliary chamber 18 through the pipe 44.

In the present embodiment, the locating recesses 11 are configured such that the pumphead can be mounted on the drive unit 1 with the tube 52 extending horizontally from the pumphead 2 (as represented in FIGS. 7 and 8) or vertically from the pumphead 2. The valve 32 is disposed within the pumphead 2 such that in each configuration, the valve 32 is situated above the pumping chamber 16. In addition, the pipe 44 is arranged at 45 degrees with respect to the general direction of extension of the tube 52 from the pumphead 2 so that in each configuration the snorkel 45 is at 45 degrees to the vertical and so defines a reservoir below the snorkel inlet 47 in each configuration.

It will be appreciated that other types of optical sensor comprising a suitable reflector could be used. For example, the optical sensor may be arranged such that when the reflector is exposed to a liquid, the amount of radiation reflected towards the receiver increases. Although a cone is described as a suitable shape for a reflecting surface, any surface, such as a pyramid or frustum, which changes the amount or direction of reflected radiation when exposed to a liquid would be suitable. Alternatively, or in addition, the reflector could be made from a suitable material and/or be provided with a coating for which the amount of reflected radiation varies depending on which the reflector is exposed to a liquid.

It will be appreciated that the sensitivity of the receiver/controller could be adjusted to prevent small amounts of liquid from generating a positive detection of a leak.

It will appreciated that the optical sensor could also be used to detect the presence or the correct mounting of the pumphead 2 on the drive unit 1 by detecting the presence of reflected radiation when the pumphead 2 is mounted on the drive unit 1.

A variant 202 of the pumphead 2 described above is shown in FIG. 9.

The pumphead 202 comprises a housing 204 formed by a cylindrical casing 206 enclosed by an integral end wall 208 at one end and by an end cap 210 at the other. In the present embodiment, the end cap 210 is ultrasonically staked to the casing 206. The casing 206 comprises an outer wall 212 and an inner wall 214 which is disposed radially inwardly of the outer wall 212. The outer wall 212 and the inner wall 214 are connected by a circumferential rib 216. The end wall 208 is formed integrally with the inner wall 214, for example as a molded monocoque structure.

The outer wall 212 extends over the inner wall 214 in the axial direction.

A circular plate 218 is disposed within the casing 206. The circular plate 218 is arranged such the periphery of the plate 218 seals against the inner surface of the outer wall 212. The plate 218 is further arranged to abut the end of the inner wall 214 such that the plate 218, inner wall 214 and end wall 208 define a pumping chamber 220. The plate 218 is provided with an axially extending rib 222 which surrounds the periphery of the inner wall 214 to support the inner wall 214.

The pumphead 202 further comprises a rotor 223 comprising a pressing element 224 which is arranged for rotation within the pumping chamber 220. The pressing element 224 comprises a radially outer surface 226 which defines lobes 228 (shown in FIG. 10) for pressing a tube mounted within the pumping chamber 220 against the inner wall 214. The radially outer surface 226 is rigidly connected to a core 230 of the rotor 223 by a lattice structure 232 extending between the core 230 and the outer surface 226 of the pressing element 224. The rotor 223 is supported for rotation by bearings 234 disposed between the outer surface 226 of the pressing element 224 and supporting features 236, 238 provided on the end wall 208 and the plate 218 respectively.

The core 230 extends through the plate 218 and the end cap 210. Respective seals 240, 242 are disposed between the core 230 and the plate 218, and between the core 230 and the end cap 210. The core 230 comprises an axially extending splined bore 243 which is arranged to receive a drive shaft, or similar drive means, of a drive unit. The rotor 223 is situated within the pumphead 202 such that it does not protrude from the pumphead housing 204.

The plate 218, outer wall 212 and end cap 210 define an auxiliary chamber 244. The auxiliary chamber 244 is separated from the pumping chamber 220 by the plate 218.

As shown in FIG. 11, leakage apertures 246 are provided in a region of the plate 218 adjacent the pumping chamber 220. It will be appreciated that a single leakage aperture could be provided.

A valve 248 is disposed between the leakage apertures 246 and the auxiliary chamber 244.

The valve 248 comprises first annular formation 250 formed on the side of the plate 218 exposed to the auxiliary chamber 244 and a stepped second annular formation 252 formed about an aperture 254 provided in the end cap 210. The first and second annular formations 250, 252 extend towards each other such that the stepped end of the second annular formation 252 fits within the end of the first annular formation 250 to define a substantially cylindrical cavity 256 extending between the aperture 254 and the plate 218. A seal 257 is disposed between the first and second annular formations 250, 252 to seal the cavity 256 from the auxiliary chamber 244.

The valve further comprises a piston 258 which is disposed within the cavity 256. First and second seals 260, 262 are disposed at opposite ends of the piston 258. The seals 260, 262 seal the piston 258 against the inside of the second annular formation 252. The piston 258 has a waisted portion between the two seals 260, 262 of reduced diameter compared with the ends of the piston 258.

Circumferentially spaced apertures 264 are provided through the portion of the second annular formation 252 between the seals 260, 262, in the vicinity of the waisted portion of the piston 258.

The first seal 260 seals the piston 258 against the second annular formation 252 to prevent fluid from leaking from the pumphead through the aperture 254 in the end cap 210. The second seal 262 seals against the end of the second annular formation 252 to prevent fluid from being transferred through the valve 248 from the pumping chamber 220 into the auxiliary chamber 244. The second seal 262 has a diameter which is greater than that of the inner diameter of the second annular formation 252.

The piston 258 comprises a pressing feature 264, such as a button, at one end which is flush with the main portion of the end cap 210. A bore 266 extends along the piston 258 within which a biasing element in the form of a compression spring 268 is disposed. One end of the spring 268 abuts the end of the bore 266 and the other end of the spring 268 abuts the plate 218. The spring 268 biases the piston 258 away from the plate 218 thereby pressing the second seal 262 against the end of the second annular formation 252 to close the valve 248.

As shown in FIG. 9, the auxiliary chamber 244 is provided with an outlet 270 which is diametrically opposite the valve 248. The outlet 270 comprises a pipe 272 which defines a snorkel 274 having an outlet 277 in the lower region of the auxiliary chamber 244. A reservoir is defined around the snorkel 274 between the snorkel 274 and the walls of the auxiliary chamber 244. The snorkel 274 is arranged such that the snorkel 274 is substantially vertical when the pumphead 202 is in use. The remaining aspects of the outlet 270 are substantially the same as those described with respect to the previously described embodiment and so will not be described here in detail.

The pumphead 202 further comprises a reflector 275 which is in accordance with the reflector described with respect to the previously described embodiment.

A tube 276 is arranged within the pumphead 202 in substantially the same manner as the previously described embodiment. However, the variation of the tube end fittings 278, 280 will now be described with reference to FIG. 10.

Each tube end fitting 278 comprises a first part 282, a second part 286 and a retaining element comprising a cap 290. The first part 282 and the second part 286 are separable.

Each first part 282 is provided with a through passage 294, an externally threaded shank 298 and an abutment shoulder 302 which correspond to the same named features of the previously described embodiment. The abutment shoulder 302 comprises a flange which provides an end face 306 of the first part 282. A circumferential recess 310 is provided in the end face 306 within which a seal 314, such as an o-ring is disposed.

Each first part 282 is provided with a tool engagement feature 318 which, in the embodiment shown, is a hexagonal socket formed in the end of the through passage 294.

Each second part 286 comprises a spigot 322 for connection with a hose, a corresponding through passage 326 and an abutment portion 330, which in the embodiment shown is a flange, which provides an end face 334 of the second part 286. The end face 334 of the second part 286 presses against the seal 314 of the first part to seal the through passages 294, 326 of the first and second parts 282, 286 in fluid communication with each other.

Each cap 290 is in accordance with the cap of the previously described embodiment with the exception that the cap 290 is provided with an internal thread 338 which engages with an external thread 342 provided on the casing 206. Each cap 290 need not therefore be resilient. Each cap 290 holds the first and second parts 282, 286 of the tube end fittings 278 in pressing engagement with each other.

Assembly and operation of the pumphead 202 is substantially in accordance with assembly and operation of the previously described embodiment of the pumphead. However, variations in the assembly and operation will now be described.

As with the previously described embodiment, each end fitting 278 is fitted by engaging the thread of the threaded shank 298 with the inner wall of the tube 276. A tool, such as an Allen key, is engaged with the tool engagement feature 318 and used to rotate the first part 282 with respect to the tube 276 to draw the tube 276 along the threaded shank 298 towards the abutment shoulder 302. Once the end of the tube 276 is firmly located in the correct position, as described with respect to the previously described embodiment, the second part 286 of the fitting 278 is placed against the seal 314 to seal the respective through passages 294, 326 in fluid engagement with each other. The cap 290 is then placed over the second part 286 and wound along the corresponding thread on the casing 206 to clamp the first and second parts 282, 286 together and to secure the fitting 278 in position.

The pumphead 202 is mounted to a drive unit (not shown) by inserting a splined driveshaft, or other suitable drive means, of the drive unit into the splined bore 243 of the rotor 223.

As shown in FIG. 12, the action of mounting the pumphead 202 on the drive unit brings the pressing feature 264 into engagement with a projection (not shown) on the drive unit. The projection forces the piston 258 inwardly against the spring 268. The second seal 262 lifts off the end of the second annular formation 252 such that an annular gap 346 is formed between the piston 258 and the second annular formation 252. This opens the valve 248. Fluid can therefore flow from the pumping chamber 22 through the leakage apertures 246 and annular gap 346, along the wasted portion of the piston 258 and through the circumferentially spaced apertures 264 into the auxiliary chamber 244.

Removal of the pumphead 202 causes the spring 268 to force the piston 258 outwardly such that the second seal 262 seals against the end of the second annular portion 252. The larger diameter of the seal 262 ensures that the piston 258 is retained within the pumphead 202. The pumping chamber 220 is therefore resealed for transportation, storage or disposal.

In both embodiments the welding or staking of the end cap or caps 8, 10; 210 to the outer wall 6, 212 respectively creates a sealed unit which cannot be disassembled without breaking the components. Consequently, at the end of the life of the pumphead 2, 202, usually following failure of the tube 52, 276, the pumphead is discarded as a unit, to be replaced by a new one.

It will be appreciated that alternatives to the snorkel 45,274 could be used to define a reservoir. For example, the outlet from the auxiliary chamber could be disposed such that the reservoir is defined in a lower part of the auxiliary chamber 18, 244 below the outlet.

The invention claimed is:

1. A peristaltic pumphead, comprising:
   a pumphead housing accommodating a pumping tube, an end of the pumping tube being provided with an end fitting having a through passage and an abutment shoulder; and
   a threaded shank extending from the abutment shoulder into the pumping tube, the tube end abutting the abutment shoulder and being accommodated in an opening in the pumphead housing, the abutment shoulder abutting the pumphead housing at the opening, and the end fitting being engaged by a retaining element to retain the abutment shoulder against the pumphead housing; wherein the threaded shank is configured to be rotated so as to draw the tube along the threaded shank towards the abutment shoulder and the opening in the pumphead housing.

2. The pumphead as claimed in claim 1, wherein the threaded shank is tapered in the direction away from the abutment shoulder.

3. The pumphead as claimed in claim 1, wherein the retaining element comprises a threaded portion which engages with a threaded portion of the pumphead housing.

4. The pumphead as claimed in claim 1, wherein the end fitting comprises separable first and second parts, the first part comprising the abutment shoulder and threaded shank and the second part comprising a spigot for attachment to a tube, the retaining element being arranged to secure the first and second parts together.

5. The pumphead as claimed in claim 4, wherein the first part comprises a tool engagement feature with which a tool can be engaged to rotate the first part with respect to the tube.

6. The pumphead as claimed in claim 2, wherein the retaining element comprises a threaded portion which engages with a threaded portion of the pumphead housing.

7. The pumphead as claimed in claim 4, wherein the first part forms a passage.

8. The pumphead as claimed in claim 4, wherein the abutment shoulder comprises a flange which provides an end face of the first part.

9. The pumphead as claimed in claim 5, wherein the tool engagement feature is formed at an end of a passage.

10. The pumphead as claimed in claim 4, wherein the second part forms a passage.

11. The pumphead as claimed in claim 4, wherein the second part comprises a flange which provides an end face of the second part.

12. The pumphead as claimed in claim 4, wherein an end face of the second part contacts an end face of the first part to seal respective passages of the first part and the second part in fluid communication with each other.

13. A method of assembling a peristaltic pumphead, comprising:
    inserting a tube end of a tube into an opening of a pumphead housing;
    inserting a threaded shank of an end fitting into the tube end such that the threaded shank engages with the tube;
    bringing an abutment shoulder into abutting engagement with the pumphead housing; and
    rotating the threaded shank with respect to the tube such that the tube is drawn along the threaded shank towards the abutment shoulder and the opening in the pumphead housing.

14. The method as claimed in claim 13, wherein rotating the threaded shank with respect to the tube draws the tube along the threaded shank into pressing engagement with the abutment shoulder.

15. The method as claimed in claim 13, wherein a retaining element is engaged with the end fitting to retain the end fitting against the pumphead housing.

16. The method as claimed in claim 14, wherein a retaining element is engaged with the end fitting to retain the end fitting against the pumphead housing.

17. The method of assembling a peristaltic pumphead as claimed in claim 13, further comprising:
    engagingly receiving a tool in a tool engagement feature of the end fitting.

18. The method of assembling a peristaltic pumphead as claimed in claim 13, wherein the end fitting comprises a first part and a second part, and wherein each of the first part and the second part form a respective through passage.

19. The method of assembling a peristaltic pumphead as claimed in claim 18, further comprising:
    placing a second part against the first part to seal the respective through passages of the first part and the second part in fluid engagement with each other.

20. The method of assembling a peristaltic pumphead as claimed in claim 19, further comprising:
    placing a cap with an inner thread over the second part; and
    rotating the cap with respect to a casing that forms the opening in the pumphead housing to clamp the first part to the second part.

* * * * *